O. H. LINDENBERG & J. F. CRUMLEY.
CHAIN.
APPLICATION FILED NOV. 29, 1915.

1,178,654.

Patented Apr. 11, 1916.

Witnesses
R. M. McCormick
A. L. Phelps

Inventors
Otto H. Lindenberg
John F. Crumley
By
C. C. Shepherd  Attorney

UNITED STATES PATENT OFFICE.

OTTO H. LINDENBERG AND JOHN F. CRUMLEY, OF COLUMBUS, OHIO, ASSIGNORS TO THE M. C. LILLEY & COMPANY, OF COLUMBUS, OHIO, A CORPORATION OF OHIO.

CHAIN.

1,178,654.

Specification of Letters Patent.

Patented Apr. 11, 1916.

Application filed November 29, 1915. Serial No. 63,925.

*To all whom it may concern:*

Be it known that we, OTTO H. LINDENBERG and JOHN F. CRUMLEY, citizens of the United States, residing at Columbus, in the county of Franklin and State of Ohio, have invented certain new and useful Improvements in Chains, of which the following is a specification.

This invention relates to chains broadly speaking and is particularly directed to that type of chain forming a portion of the equipment or accoutrement of military orders or the like. Specifically, the chain forming the subject matter of the present invention is designed to be attached to the sword scabbard carried by the members of various military organizations to attach the same to the belt or other dress portion of the wearer.

Our invention is directed to the provision of a chain of the type referred to, which may be manufactured at a comparatively small cost, and the invention itself resides particularly in the peculiar combination of jointless links combined with the transversely arranged open links. This arrangement enables a workman to effect a very rapid assemblage of the parts to produce the required length of chain and above all, it reduces the cost of labor, in that it overcomes soldering of the various links, as has been required heretofore.

Figure 1:
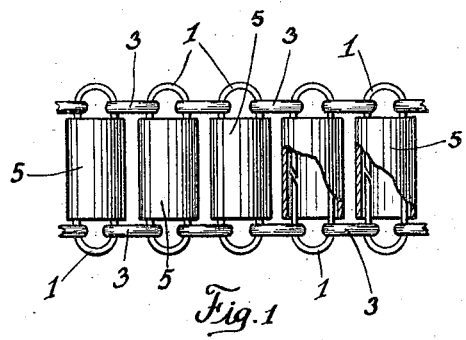
Figure 2:
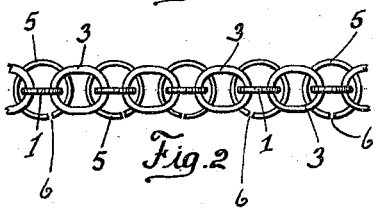
Figures 4, 5:
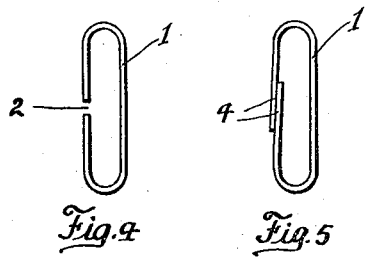
Figure 3:
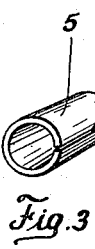

The preferred embodiment of our invention is shown in the accompanying sheet of drawings, in which similar characters of reference designate corresponding parts, and in which:

Figure 1 is a top plan view of a section of chain constructed according to the present invention, Fig. 2 is a side view of the structure shown in Fig. 1, Fig. 3 is a view in perspective of one of the barrels used in the chain construction, Fig. 4 is a face view of one form of transverse link used by us, and, Fig. 5 is a face view of another form of transverse link used by us.

In these drawings, there are shown a plurality of what we have termed transverse links, these links being designated by the reference numeral 1 and shown in detail in Figs. 4 and 5. In Fig. 4 the link is constructed of a wire bent to the shape shown and wherein the meeting ends are spaced slightly as is shown at 2, to permit the insertion of the jointless side links 3. In Fig. 5, the transverse link is shown constructed so that the ends overlap slightly as is shown at 4 and in this construction, it is necessary to slightly spread the overlapping ends, in order to permit the insertion of the jointless side links 3. These side links 3 are preferably stamped out and may be jointless to avoid the necessity of soldering the various ends together, inasmuch as it is the links 3 which really form the burden bearing portion of the chain as a whole. These links are inserted either through the open portion 2 of the transverse links 1 or through the overlapping ends 4 and are then located in opposite ends of these transverse links after the manner illustrated particularly in Fig. 1. After this has been accomplished, we encircle the links 1 with barrels such as are shown at 5, these barrels being preferably constructed of metal which allows their bending to circular shape, after they have been made to embrace the transverse links. These barrels encircle the transverse links for the twofold purpose of properly spacing the end links 3 and also of covering the open portions of these transverse links to prevent the accidental escape of the links 3. In addition, these barrels may be stamped to present various impressions to add to their decorativeness and in this manner a chain of highly ornamental nature may be produced. After the transverse and end links have been assembled after the manner related, the barrels are placed in position over the transverse links by sliding them through their open portions and after this has been accomplished, a suitable tool is used for bringing the edges of the barrels into meeting engagement as is shown at 6. In this manner, the barrels are held permanently in their applied position to properly space the end links and also to avoid their accidental escape.

From the foregoing description, it will be apparent that we have provided a type of chain which may be produced at a comparatively small cost and one in which the necessity for soldering the various ends of the chain links together to make them endless, has been overcome. By making the end links 3 of a jointless nature, considerable strength has been added to the chain as a whole and the time for their production has been materially decreased.

What we claim is:

A chain comprising a plurality of open transversely arranged links, jointless links joining said transverse links, said jointless links being located in both ends of said transverse links, and a barrel encircling each of said transverse links and holding the endless links spaced, the open portion of said transverse links being located within the barrels.

In testimony whereof we affix our signatures in presence of two witnesses.

OTTO H. LINDENBERG.
JOHN F. CRUMLEY.

Witnesses:
ROBT. LINDENBERG,
CLARA B. HUNT.